Figure 1:
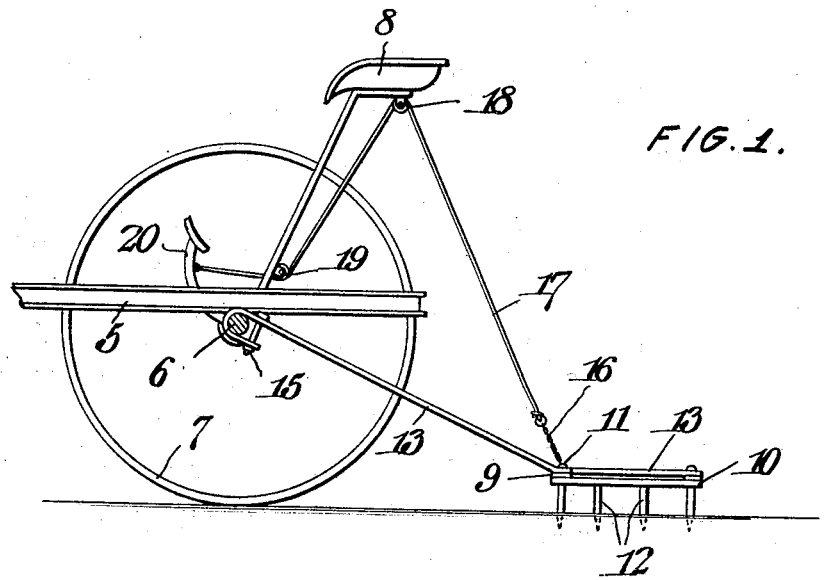

H. E. REA.
HARROW.
APPLICATION FILED AUG. 31, 1917.

1,262,983.

Patented Apr. 16, 1918.

WITNESSES
W. C. Fielding
Dwight F. Etter

INVENTOR
Harry E. Rea

BY Richard B. Owen
ATTORNEY

UNITED STATES PATENT OFFICE.

HARRY E. REA, OF RED OAK, IOWA.

HARROW.

1,262,983.  Specification of Letters Patent.  Patented Apr. 16, 1918.

Application filed August 31, 1917.  Serial No. 189,170.

*To all whom it may concern:*

Be it known that I, HARRY E. REA, a citizen of the United States, residing at Red Oak, in the county of Montgomery and State of Iowa, have invented certain new and useful Improvements in Harrows, of which the following is a specification.

This invention relates generally to harrows, and particularly to harrows applicable to corn planters or other agricultural machinery, aiming primarily to generally simplify and improve the construction and operation of harrows of this character, as well as to increase their efficiency.

A further object of the invention is to provide a harrow which shall be of simple and inexpensive construction, and which is capable of being readily applied to planters of various types, having associated therewith improved means for raising or lowering the harrow.

With these objects in view together with others which will appear as the description proceeds, the invention resides in the novel formation, combination and arrangement of parts, all as will be described more fully hereinafter, illustrated in the drawing, and particularly pointed out in the claims.

Figure 2:
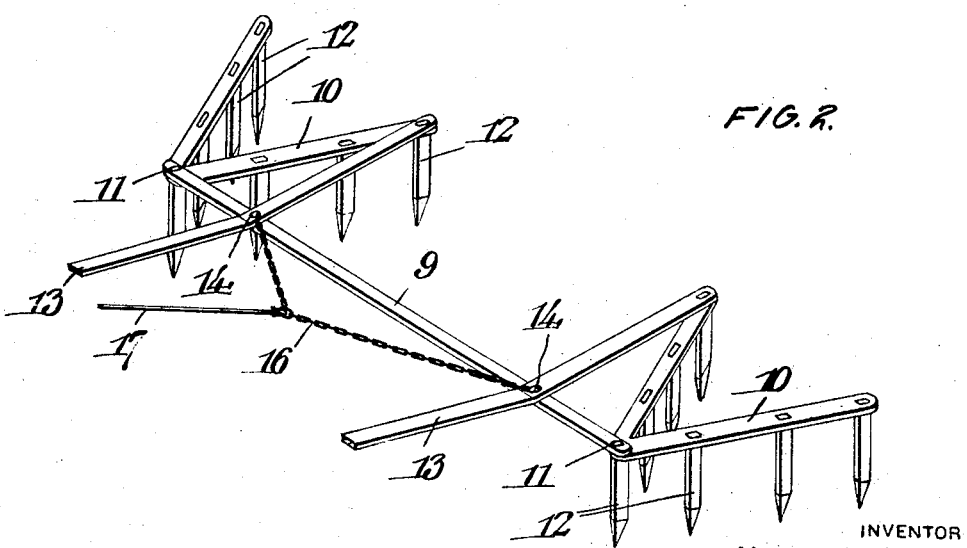

In the drawing:

Figure 1 is a fragmentary sectional view taken through a conventional form of planter vehicle, and illustrating the application of a harrow constructed in accordance with the invention, and Fig. 2 is a detail perspective view of the harrow of my invention.

Referring now to the drawing, 5 indicates the supporting frame of a planter, 6 the axle thereof, 7 the ground-engaging wheels, and 8 the seat for the accommodation of the operator of the harrow.

The improved harrow includes a bar 9, formed of suitable light but durable metal, and which is preferably of a length equal to the distance between the ground-engaging wheels of the planter. This bar has secured to each end a frame member 10, and these frame members are also formed of strap metal of substantially V-shape. The frames 10 are secured at their apexes as at 11 to the extremities of the bar 9, and both of the said frames project laterally from one side of the said bar. These frames may be provided with suitable apertures for the accommodation of the ground-engaging harrow teeth 12, and the said apertures may be spaced apart any desired distance.

The means provided for securing the harrow to the vehicle comprises a pair of arms 13, one being secured adjacent each end of the harrow. These arms are secured at their rear extremities to the innermost ends of the V-shaped frame members 10, and project forwardly therefrom and across the bar 9. The arms 13 are secured to the bar 9 as at 14, and extend upwardly and forwardly therefrom to the vehicle. The extreme forward end of the arms 13 are shaped so as to engage around the axle 6 of the vehicle, and bolts 15 are employed for securing the hooked forward end of the said arms around the said axle. By securing the arms to the axle 6, the said arms are capable of swinging with the said axle as a pivot, so that the harrow at the extreme rear ends of the said arms may be moved toward and away from the ground.

Secured to the harrow in any preferred manner and extending longitudinally of the bar 9 is a chain 16 having secured intermediate the ends thereof the rear end of a rope or cable 17, the said rope passing forwardly and upwardly and over the pulley 18 secured to the seat of the vehicle. The rope then passes downwardly and forwardly and over a pulley 19 secured in any convenient position upon the vehicle, and is connected at its terminal to an operating lever, such as a pedal 20. By this arrangement, forward motion of the pedal will cause the harrow to be raised, and when the pedal is released, the weight of the harrow carries the latter downwardly, so that the teeth thereof will engage in the ground. If desired, the rope 17 may be secured to the handle or operating lever upon the planter, so when the depth gage upon the planter is operated, the harrow will be simultaneously moved.

By providing a harrow of this character for use in connection with planters, the rows while being planted are at the same time harrowed, thus preventing the seed being washed. The particular arrangement of harrow frame obviates the possibility of clogging of the teeth, so that the efficiency of the harrow in use is not impaired.

While the present is a disclosure of what is believed to be the preferred embodiment of the invention, it is to be understood that the invention is not limited thereto, as various changes in the minor details of construction, proportion, and arrangement of parts may be resorted to if desired without departing from the spirit of the invention as defined by the appended claims.

What is claimed is:

1. In a device of the class described, the combination with a vehicle frame; of a harrow including a laterally disposed bar, teeth supporting frames at the ends of said bar, arms pivoted at their forward ends upon said vehicle and being secured at their rear ends to said bar, and means for raising or lowering said bar.

2. In a device of the class described, the combination with a vehicle frame; of a harrow including a bar, a pair of substantially V-shaped tooth frames secured at their apexes upon each end of said bar and extending rearwardly therefrom, a pair of arms each secured at its rear end to one of said toothed frames and being pivoted at their forward ends to said vehicle, the said arms being secured to said bar, a lever on said vehicle, a rope connecting said lever with said bar, whereby the latter may be moved by moving the lever.

In testimony whereof I affix my signature in presence of two witnesses.

HARRY E. REA.

Witnesses:
W. E. DRAPER,
C. G. ELLWOOD.

Copies of this patent may be obtained for five cents each, by addressing the "Commissioner of Patents, Washington, D. C."